Aug. 20, 1968    O. F. MASTRIFORTE ETAL    3,397,894
ROTARY SHAFT SEAL
Original Filed Jan. 15, 1965
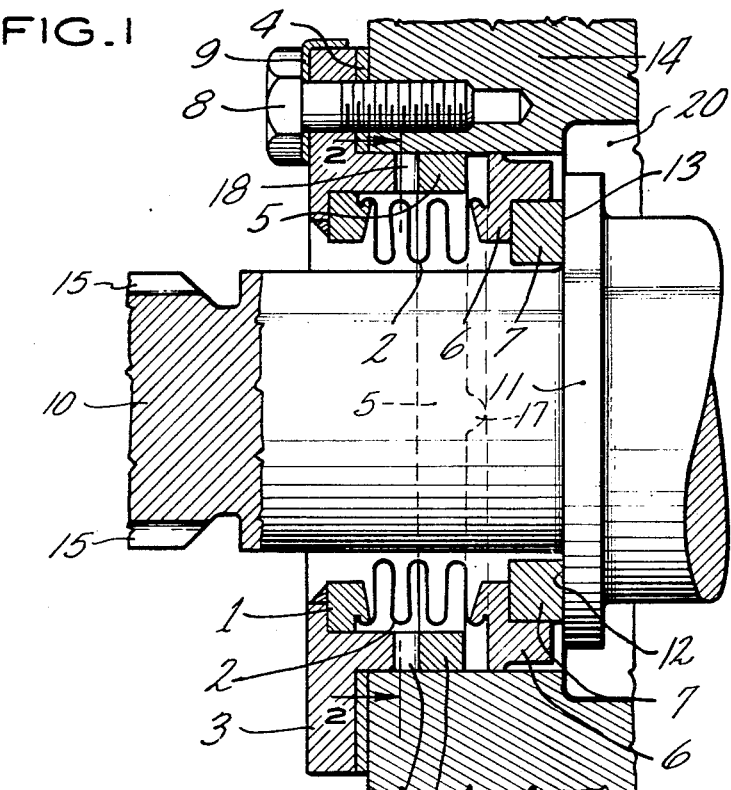
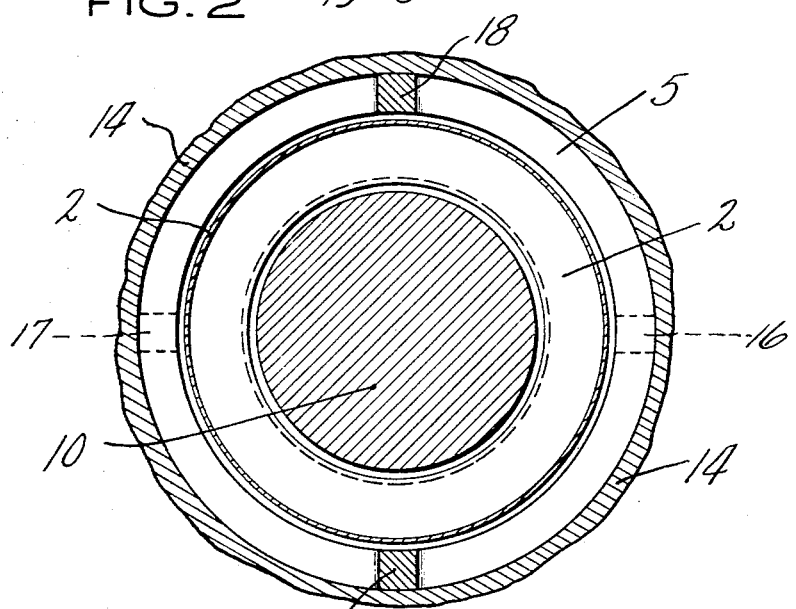
INVENTORS
OTIL F. MASTRIFORTE
JOHN H. FAULDS
BY *A. M. Prentiss*
ATTORNEY

United States Patent Office 3,397,894
Patented Aug. 20, 1968

---

3,397,894
ROTARY SHAFT SEAL
Otil F. Mastriforte, Newington, and John H. Faulds, Manchester, Conn., assignors to Chandler Evans Inc., West Hartford, Conn., a corporation of Delaware
Continuation of application Ser. No. 425,716, Jan. 15, 1965. This application Jan. 2, 1968, Ser. No. 695,284
3 Claims. (Cl. 277—30)

ABSTRACT OF THE DISCLOSURE

Bellow ends are permanently attached respectively to a face seal structure and a housing end plate through which a shaft protrudes, the bellows urging the seal element away from the end plate and against a flange integral with a segment of the shaft positioned within the housing. A wobble washer circumscribing the bellows transmits aligned or misaligned high axial thrust loads from the flange to the housing end plate thereby preventing distortion of the bellows under high load which would result in fluid leakage past the face seal.

---

This application is a continuation of Ser. No. 425,716, filed Jan. 15, 1965, and now abandoned.

This invention relates to rotary shaft seals used to prevent the escape of high temperature-high pressure fluid between a rotary shaft and a stationary housing; in particular this invention pertains to a sealing arrangement containing no elastomeric material that will maintain an efficient sealing relationship between a rotating shaft and a non-rotating seal element, wherein the rotating shaft is subjected to both limited axial and angular movement in relation to the stationary housing, under conditions varying from zero to high axial thrust loading.

The satisfactory operation of rotating shaft seals to prevent the escape of fluid betwen the rotating shaft and the stationary housing has been severely taxed by the ever increasing requirements for operation in a high ambient temperature environment coupled with high fluid operating pressures. The high ambient operating temperatures have made it necessary to provide a rotating shaft seal that does not contain any elastomeric substances, because of the propensity of these elastomeric substances to become hard and non-resilient when subjected to high temperature.

Furthermore, all of the elements of these rotating shaft seals must be constructed of materials that are highly resistant to corrosion when operating in conjunction with a wide variety of volatile fluids, particularly aromatic fuels.

Additionally, in order to insure a fluid tight seal under static conditions when no fluid pressure is present, as well as under dynamic conditions when fluid pressure is present, these rotating shaft seals are required to be so constructed that, the sealing surface of the non-rotating sealing element will remain in constant complete circumferential engagement with, and will constantly conform to the angular and axial displacement of, the rotating shaft in a pronounced vibratory environment and under high axial loads.

Heretofore, in the art of rotating shaft seals the requirement of providing a seal that does not contain any elastomeric substances has usually been met by creating a rotating shaft seal that utilizes a metal bellows to satisfy the requirement for a yielding or flexible member that will simultaneously provide the axial force necessary to hold the stationary sealing element in engagement with a rotating sealing unit subject to axial and angular misalignment. It has been found through extensive test, however, that the elevated temperatures wil cause the metal bellows to distort structurally when subjeced to a substantial concurrent axial load. This condition renders the bellows ineffective as a means of keeping the stationary seal element in engagement with the axial and angular displacements of the rotating sealing element.

It is the purpose of this invention to solve these high temperature rotating shaft seal problems by devising a rotating shaft seal, containing no elastomeric substances, that utilizes a metal bellows secured to a stationary seal ring in such a manner as to provide an axial force urging the stationary seal ring against the sealing surface of the rotating flange of the rotating shaft, but limiting the axial movement of the bellows assembly by means of a co-acting universal joint like assembly such that the universal joint like means will effect a transfer of the main or major portion of the axial load from the bellows assembly to the housing through the co-acting universal joint like member and the stationary seal ring.

Accordingly, one of the principal objects of our invention is to provide a rotating shaft seal arrangement containing no elastomeric substances that will provide a fluid right sealing arrangement betwen an axially and angularly displaceable rotating shaft and a stationary housing under conditions of elevated ambient temperature and high operating pressure.

Another object of our invention is to provide a fluid tight rotating shaft seal arrangement wherein the sealing surfaces are maintained in constant engagement under conditions varying from zero to high differential pressure across the face of the sealing unit.

A further object of our invention is to provide a fluid tight rotating shaft seal capable of simultaneously withstanding high thrust loads and limited axial and angular misalignment of the rotating sealing surface when operating under conditions of high ambient temperature and high fluid pressure.

Further objectives of our invention are to devise a rotating shaft seal that embodies the following novel features:

(a) Use of a rotary shaft seal arrangement that incorporates a universal joint like member intermediate the stationary seal ring and the housing and circumscribing a bellows assembly such that the major structural load is transmitted to the housing through the universal joint like member and not through the bellows.

(b) Use of a universal joint like member circumscribing a metal bellows and located intermediate the stationary seal ring and the housing wherein the co-action of the stationary seal ring, universal joint like means and housing provides an organization that will permit angular and axial misalignment of the rotating shaft and its integral sealing flange while maintaining complete sealing engagement between the rotating flange and the stationary seal ring.

Other and further objects of our invention will become apparent to those skilled in the art as the description proceeds.

With the aforementioned and other objects in view, which may be incidental to our improvements, our invention comprises the combination and arrangement of elements described hereinbelow and illustrated in the accompanying drawings wherein:

FIGURE 1 is a fragmentary axial sectional view of a pump incorporating the preferred embodiment of our invention.

FIGURE 2 is a sectional view taken substantially along the line 2—2 of FIGURE 1.

Referring to FIGURE 1, the rotating shaft seal arrangement disclosed therein comprises a rotating shaft 10 with an integral flange 11. Shaft 10 has splines 15 which are located outboard of flange 11 and engage a drive mechanism (not shown). It will be appreciated that the drive mechanism which engaging splines 15 being a conventional drive mechanism is not shown in the accompanying drawing. The flange 11 contains an outboard radially disposed sealing surface 12, said sealing surface being disposed in a plane approximately at right angles to the axis of rotation of shaft 10. The inboard end of shaft 10 engages a pump gear or impeller (not shown). It will be appreciated the pump gear or impeller and the engagement means of shaft 10 being conventional, the engagement of shaft 10 to the pump is not shown.

The stationary portion of the seal comprises a seal ring 6 into which is pressed in fluid tight engagement a carbon seal ring insert 7. The integral combination of the seal ring 6 and its carbon insert 7 comprises the stationary seal ring element. Bellows 2 is secured in fluid tight arrangement to seal ring 6 and seal cover insert 1. Seal cover insert 1 is pressed into and brazed to seal cover 3 in such a manner that elements 7, 6, 2, 1 and 3 provide a fluid tight arrangement. Wobble washer 5 circumscribes bellows 2 and is positioned intermediate seal ring 6 and seal cover 3 such that the two inboard projections 16 and 17 of wobble washer 5 contact the outboard face of seal ring 6 and the two outboard projections 18 and 19 of wobble washer 5, which projections are disposed 90 degrees from said inboard projections 16 and 17, contact the inboard face of seal cover 3. The two outboard projections 18 and 19 of wobble washer 5 are diametrically opposed in fixed relationship to the two inboard projections 16 and 17 such that a line connecting the center of the two inboard lobes of projections 16 and 17 will be at right angles to a line connecting the center of the two outboard lobes of projections 18 and 19. This arrangement permits a universal joint like action of seal ring elements 6 and 7 such that sealing face 13 of seal ring element 7 will remain in complete sealing engagement with sealing face 12 of flange 11 during the axial and angular excursions of shaft 10 and its integral flange 11.

The spring action of bellows 2 produces an axial force that urges seal ring elements 6 and 7 into sealing engagement with flange 11 such that the sealing surfaces 12 and 13 are maintained in sealing engagement under static conditions. Outboard axial movement of shaft 10 and its integral flange 11 will cause stationary seal ring elements 6 and 7 to be moved axially outward until the projections 16, 17, 18 and 19 of wobble washer 5 bring seal ring 6 into axial engagement with seal cover 3, through wobble washer 5, thus transmitting axial loads directly through this assembly. This axial movement of seal ring 6 produces a small compression of bellows 2; however, the major axial load is transmitted from seal ring 6 through wobble washer 5 to seal cover 3 and thence by means of bolts 8 into housing 14.

Seal cover 3 is secured to housing 14 by means of bolts 8 in a manner so as to provide a fluid tight and fixed relationship between seal cover 3 and housing 14. Bolts 8 are locked to cover 3 by lock washer 9. An appropriate metallic sealing gasket 4 is provided between housing 14 and seal cover 3 to effectuate a fluid tight seal between these two elements.

This organization provides a universal type action through wobble washer 5 with metal bellows 2 providing the flexible member permitting universal motion of stationary seal ring elements 6 and 7 with the major axial loads being transmitted through the wobble washer element instead of the bellows element.

The construction of stationary seal ring elements 6 and 7, wobble washer 5, and seal cover 3 are such that when seal ring element 6 is in contact with projections 16 and 17 of wobble washer 5 and seal cover 3 is in simultaneous contact with projections 18 and 19 of wobble washer 5, the universal joint like motion resulting from this arrangement and permitted by the flexible action of metal bellows 2 allows non-rotating seal ring 7 to conform to the axial and angular movement of rotating flange 11, and thus maintains the fluid tight integrity of non-rotating seal ring 6 and rotating flange 11 under conditions of maximum permissible angular and axial displacement of rotating shaft 10 and its integral flange 11.

The construction of stationary seal ring elements 6, 7 and bellows 2 in relation to the rotating flange 11 of rotating shaft 10 is such that fluid pressure in cavity 20 will force the sealing face 13 of non-rotating seal element 7 against the sealing face 12 of flange 11. This action is achieved by arranging stationary seal elements 6, 7 and bellows 2 so that the outboard radially extending surface of bellows 2 combined with the effective outboard radially extending face of seal ring 6 presents a larger area exposed to fluid pressure than the inboard radially extending face of flange 11, thus producing a differential area and a resulting force unbalance whereby stationary seal ring 6 and 7 are urged axially inboard against sealing face 12 of flange 11. The magnitude of this axial force is dependent upon the magnitude of the fluid pressure present in cavity 20.

To illustrate the conditions that may be encountered in a rotating shaft seal arrangement such as the one described herein, the fluid pressure in cavity 20 may be 300 p.s.i. with the temperature of the fluid 350° F. and the speed of shaft 10 may be 5000 r.p.m. The temperature adjacent the outboard surface of seal cover 3 may be 950° F. and the pressure may be 15 p.s.i. The total axial compression of bellows 2 prior to the engagement of seal ring 6 and seal cover 3 through wobble washer 5 may be .100 inch. Sealing face 13 of stationary seal ring 7 may be required to maintain constant complete circumferential engagement with sealing face 12 of rotating flange 11 when flange 11 is simultaneously axially displaced .020 inch and angularly displaced 2 degrees.

While we have illustrated and described a preferred embodiment of our invention, it is to be understood that such is merely illustrative and not restrictive, and that variations and modifications may be made therein without departing from the spirit and scope of our invention. We therefore do not wish to be limited to the precise details set forth, but desire to avail ourselves of such changes as fall within the purview of our invention.

What we claim is:

1. A shaft seal adapted to compensate for the axial and angular motion of a shaft encased in a housing comprising, a shaft having a flange connected thereto, a first load bearing element having a radially disposed sealing surface, a second load bearing element fixedly secured to said housing, resilient means intermediate and secured in a fluid tight manner to said first and said second load bearing elements to form a fluid tight assembly, said resilient means urging said first load bearing element into continuous sealing engagement with said flange, universal joint like means circumscribing said resilient means and interposed between said first and second load bearing elements in a spaced apart relationship to form a stop therebetween whereby responsive to limited axial movement of said shaft said first and second load bearing elements directly engage said universal joint like member to limit the axial compression of said resilient means while simultaneously permitting said first load bearing element to move in all directions responsive to angular movement of said flange.

2. Apparatus for sealing a shaft, as claimed in claim 1, wherein said resilient means comprises a metallic bellows.

3. Apparatus for sealing a shaft, as claimed in claim 2, wherein said universal joint like means comprises an annular ring having a pair of protuberances disposed on each side of said ring the centerline of the pair of said protuberances on one side angularly displaced at right angles to the centerline of the pair of said protuberances on the opposite side.

References Cited

UNITED STATES PATENTS

| | | |
|---|---|---|
| 1,953,383 | 4/1934 | Albertson. |
| 2,080,403 | 5/1937 | Homan. |
| 2,418,185 | 4/1947 | McConaghy. |
| 2,434,589 | 1/1948 | Roth. |
| 2,515,410 | 7/1950 | Laas. |

SAMUEL ROTHBERG, *Primary Examiner.*